United States Patent
Marion et al.

(10) Patent No.: US 9,583,008 B2
(45) Date of Patent: Feb. 28, 2017

(54) MANAGING DATA EXCHANGE BETWEEN AN AVIONIC CORE AND AN OPEN WORLD DEVICE

(71) Applicant: Airbus Operations (S.A.S.), Toulouse (FR)

(72) Inventors: Gaetan Marion, Beauzelle (FR); Jean-Claude Mere, Verefeil (FR); Pierre Neri, Tournefeuille (FR); Julien Bernat, Toulouse (FR); Marc Vie, Labarthe sur Leze (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/960,046

(22) Filed: Dec. 4, 2015

(65) Prior Publication Data

US 2016/0163202 A1    Jun. 9, 2016

(30) Foreign Application Priority Data

Dec. 5, 2014 (FR) ...................................... 14 61946

(51) Int. Cl.
G01C 23/00 (2006.01)
G08G 5/00 (2006.01)

(52) U.S. Cl.
CPC ............. *G08G 5/0047* (2013.01); *G01C 23/00* (2013.01); *G08G 5/0021* (2013.01); *G08G 5/0013* (2013.01)

(58) Field of Classification Search
CPC .. G08G 5/0047; G08G 5/0021; G08G 5/0013; G01C 23/00
See application file for complete search history.

(56) References Cited

U.S. PATENT DOCUMENTS

| 6,317,659 | B1 | 11/2001 | Lindsley et al. |
| 7,903,594 | B1 * | 3/2011 | Marmur ............... G08G 5/0013 370/310 |
| 2006/0031006 | A1 | 2/2006 | Stenbock et al. |
| 2007/0032921 | A1 | 2/2007 | Allen |
| 2009/0105943 | A1 | 4/2009 | Ferro et al. |
| 2009/0150012 | A1 | 6/2009 | Agam et al. |
| 2010/0049378 | A1 | 2/2010 | Hiale-Guilhamou et al. |
| 2012/0078450 | A1 | 3/2012 | Marche et al. |
| 2012/0265372 | A1 * | 10/2012 | Hedrick .................. H04L 67/36 701/3 |

(Continued)

OTHER PUBLICATIONS

French Search Report cited in FR 1461946, completed Sep. 22, 2015, two pages.

(Continued)

*Primary Examiner* — Rodney Butler
(74) *Attorney, Agent, or Firm* — Nixon & Vanderhye P.C.

(57) ABSTRACT

A flight management system includes: an avionics core implementing generic aircraft management functionalities and providing services associated with the generic functionalities; at least one remote functionality in an open world part performing a function of interfacing between the avionics core and the open world applications run on the open world part which need to communicate with the avionics core, wherein the remote functionality ensures homogeneity and consistency of data exchanged and guaranteeing integrity and security of data exchanges, and an exchange interface of between the avionics core and the open world functionality supporting data exchanges.

15 Claims, 2 Drawing Sheets

(56) References Cited

U.S. PATENT DOCUMENTS

| | | |
|---|---|---|
| 2014/0180507 A1 | 6/2014 | Geay et al. |
| 2015/0066342 A1* | 3/2015 | Garzella .......... G06Q 10/06311 701/120 |
| 2016/0083118 A1* | 3/2016 | Mahalingaiah ....... B64F 5/0045 701/32.1 |
| 2016/0122036 A1* | 5/2016 | Hathaway ............... B64C 19/00 701/14 |
| 2016/0171895 A1* | 6/2016 | Scharl .................. G08G 5/0021 701/4 |

OTHER PUBLICATIONS

"Federal Aviation Administration Subject: 1-10 Information: Policy and Guidance for Electronic Flight Bag Class 1 & 2 System Architecture and Aircraft Connectivity Background", Sep. 17, 2010 (Sep. 17, 2010), XP055214332, Extrait de l'Internet: URL:https://www.nbaa.org/ops/safety/in-flight-safety/hazmat/lithium-batteries/faa-efb-hardware-policy-memo.pdf [extrait le Sep. 18, 2015] *section 2 efb connectivity*, nine pages.

\* cited by examiner

MANAGING DATA EXCHANGE BETWEEN AN AVIONIC CORE AND AN OPEN WORLD DEVICE

RELATED APPLICATION

This application claims priority to French Patent Application 1461946 filed Dec. 5, 2014, the entirety of which is incorporated by reference.

TECHNICAL FIELD

The present invention relates to a management system for an aircraft, in particular for a Flight Management System (FMS) for a transport aircraft. The invention may be embodied as other types of avionics systems, such as an airport navigation system.

BACKGROUND OF THE INVENTION

Current avionics architectures generally comprise an avionics part that includes a flight management system that offers the flight crew, e.g., pilots, the option to define a flight path before a flight and to maintain or change the flight path during the flight.

An avionics part (or avionics world) relates to on-board elements (computer, systems, etc.), which are secured so as to obey given constraints of integrity and availability.

An open world part relates to on-board equipment (laptop, tablet, etc.) in the cockpit of the aircraft and hosting applications, which are not sufficiently secure to be integrated as the avionics part (or avionics world) in the aircraft.

A strict segregation exists between the avionic part (avionics world) and the open world. Because of the segregation, integration of functions performed in the cockpit by the open world parts with the avionics part is very limited, which greatly reduces their utility. The limited integration causes the crew to juggle between the avionics part and the open world part while in the cockpit. The juggling includes manually transferring information between the avionics part and the open world part, which creates extra work for the crew and a risk of a data error occurring during the transfer.

Mainly for reasons of cost and simplicity of development, many initiatives are emerging for implementing open world side functionalities aimed at simplifying the task of the crew regarding the management of the aircraft's mission.

SUMMARY OF THE INVENTION

A data exchange management system has been invented for an aircraft, in particular for a flight management system, that reduces the risk of data transfer error and the manual efforts needed to transfer data between the avionics part and the open world part.

The novel management system comprises an avionics core configured to implement generic aircraft management functionalities and provide services associated with at least the following generic functionalities;

(i) at least one remote functionality in an open world part, performing a function of interfacing between the avionics core and open world applications that need to communicate with the avionics core. The remote functionality provides homogeneity and consistency of data exchanged between the open world part and the avionics core, and (ii) an exchange interface between the avionics core and the at least one remote functionality supporting the data exchanges.

Using the at least one remote functionality and the exchange interface, it is possible to interface open world applications with the avionics core of the flight management system, which contains the main functionalities (generic functionalities) for flight management, while ensuring homogeneity and consistency of data exchanged and guaranteeing integrity and security of data exchanges. Thus, the novel management system addresses the problem of integrating open world applications in the management system, which overcomes the aforementioned shortcoming.

The avionics core may include:

(i) a set of software partitions grouped on at least one hardware partition and implementing the generic management functionalities; and (ii) a set of functional services in connection with the set of generic functionalities implemented by the avionics core and open to requests from applications external to the avionics core.

In addition, the remote functionalities may include at least some of the following elements:

(i) functionalities configured for: ensuring consistency of data, merging and/or consolidation of data from open world applications to the avionics core; performing at least one part of securing the data; extracting data from models used by open world applications for supplying the simplified models of the avionics core; and exporting data from the avionics core to the open world applications;

(ii) functional services offering access for the avionics core to one or more of: specific data hosted on an open world platform; and services carried by open world applications via the at least one remote functionality;

(iii) functional services offering access for the open world applications to one or more of: avionics core data; and functional services in connection with the set of functionalities supported by the avionics core.

The exchange interface between the avionics core and the at least one remote functionality is based on at least some of the following elements: bidirectional data requests; bidirectional function execution requests; bidirectional event warnings; bidirectional message transfers; and bidirectional file transfers.

In addition, the exchange interface may comprise a data securing module configured to automatically monitor data to be transmitted and to automatically manage an authorization to transmit data between the avionics core and the at least one remote functionality, according to the monitoring.

The data securing module includes at least one of the following security applications: an incorrect data flow detection application; a data consistency and format checking application; and a data decryption application.

The data securing module may comprise a switching element, the switching element being of one of the following types: hardware type or a software type.

Further the management system may correspond to different avionics systems, such as, for example, an airport navigation system or an aircraft flight management system (FMS).

The generic functionalities implemented by the avionics core may include at least some of the following functionalities:

(i) flight plan management;
(ii) calculation of flight trajectory of the aircraft;
(iii) calculation of predictions along the flight trajectory;
(iv) extrapolation of meteorological conditions along the flight trajectory;
(v) calculation of a position of the aircraft;

(vi) calculation of deviations between the position of the aircraft and a flight trajectory determined by the FMS;

(vii) calculation of guidance set points for guiding the aircraft along the fight trajectory determined by the FMS; and (viii) at least one part of a data securing function.

Moreover, in a second variant of the embodiment, the generic functionalities, implemented by the (simplified) avionics core, may only include the following functionalities:

(i) flight plan management;

(ii) a calculation of trajectory in space;

(iii) a calculation of deviations between a position of the aircraft and a trajectory; and (iv) a calculation of guidance set points for locking the aircraft onto a trajectory.

The present invention also relates to an aircraft, in particular a transport aircraft, which is provided with a management system, such as the one specified above.

BRIEF DESCRIPTION OF THE FIGURES

The appended figures will make clear how the invention may be implemented. In these figures, identical references designate similar elements.

DETAILED DESCRIPTION OF THE INVENTION

Figure 1:
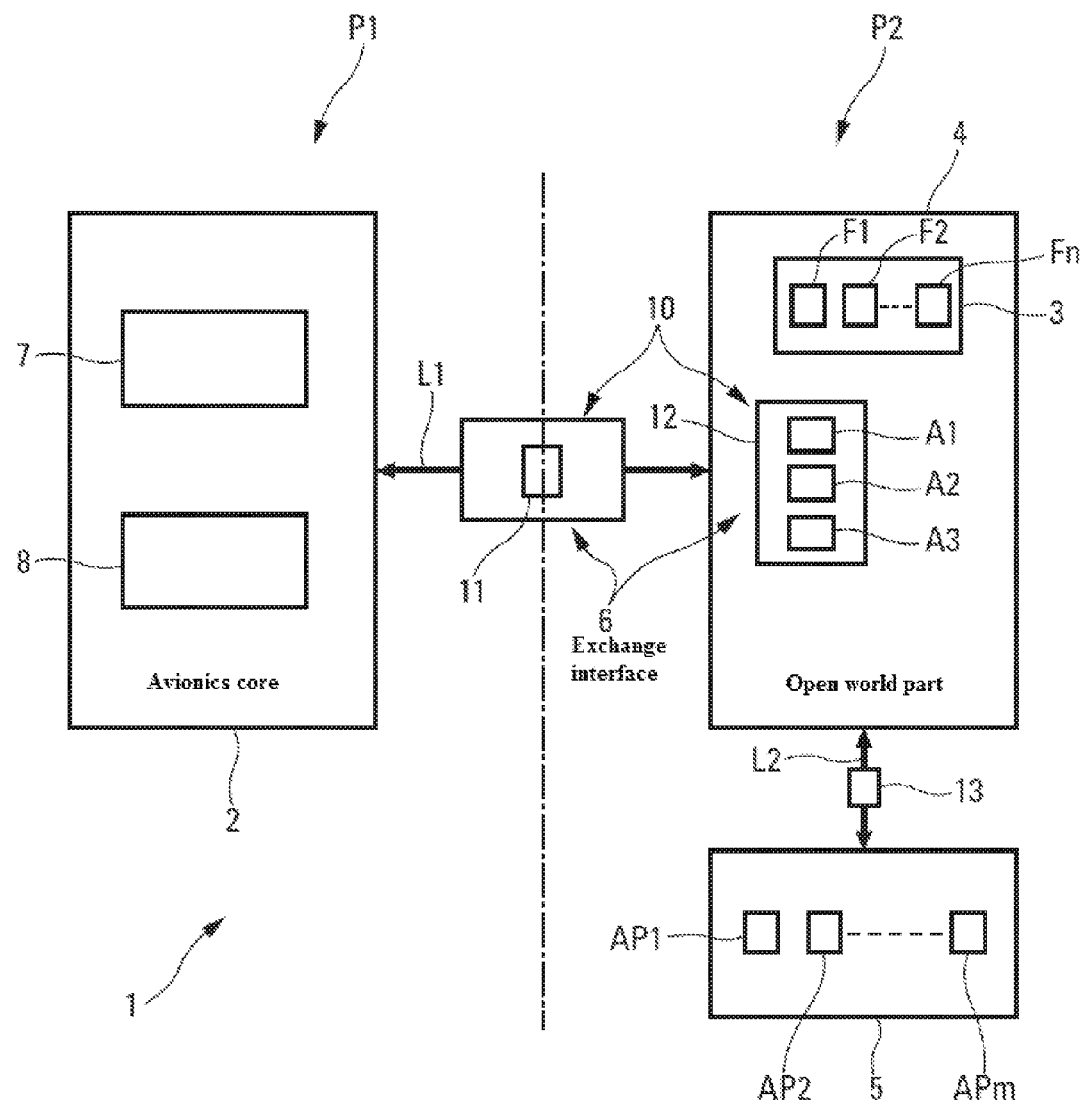
FIG. 1 is the block diagram of one embodiment of an aircraft flight management system.

The system 1 schematically represented in FIG. 1 and illustrating the invention, is intended for the management notably of a mission of an aircraft (not represented), in particular of a passenger or cargo transport aircraft.

This system of managing a mission, e.g. of the flight of the aircraft, may be a Flight Management System (FMS) that includes one or more computer systems dedicated to flight avionics and software systems providing avionics functions and run on the computer system. Alternatively, the system may be another avionics system, such as an airport navigation system. In the following description, the system 1 described is the example of a flight management system.

FIG. 1 shows a flight management system (FMS) 1 that includes: an avionics core 2, which implements generic aircraft flight management functionalities and a provision of services associated with at least those generic functionalities, specified below.

The FMS 1 also includes a set 3 comprising at least one remote functionality in an open world part (or equipment) 4, performing a single interfacing function between the avionics core 2 and a set 5 of open world applications, which need to communicate with the avionics core 2, ensuring the homogeneity and consistency of the data exchanged and guaranteeing the integrity and security of data exchanges, as well as compliance with the formats used by the avionics core 2.

The FMS 1 further includes an exchange interface 6 between the avionics core 2 and the set 3 of remote functionality/functionalities supporting data exchanges and guaranteeing a segregation between these elements.

FIG. 1 highlights an avionics part P1 and an open world part P2. Set 3 includes a plurality of remote functionalities F1, F2, ..., Fn, n being an integer, and set 5 includes a plurality of open world applications AP1, AP2, ..., APm, m being an integer.

The transmission of information between the avionics core 2 and the open world part 4 may, notably, be implemented by Ethernet link, by an A429 bus, or by Wifi link, as illustrated by a double link L1. In addition, the transmission of information between the open world part 4 and set 5 may, notably, be implemented by Wifi or 3G/4G link, as illustrated by a double link L2.

In one particular embodiment, the open world part 4 includes an EFB (Electronic Flight Bag) electronic flight device, or any other laptop or touch tablet, used in particular to prepare a flight of the aircraft.

This architecture of the system 1 facilitates integration into the system 1 of open world applications (outside of avionics), such as mission management applications installed on an EFB device, a tablet, or a laptop in the cockpit. This effectively assists the crew of the aircraft in its task of carrying out the mission in several ways, including:

(i) by removing into the open world part 4 a function of merging, concentrating, and converting data exchanged between these open world applications and the avionics core 2;

(ii) by manipulating these data for generating elements, such as a flight plan, a trajectory, performance data, predictions, etc., which will supply the avionics core 2; and (iii) by securing the link between the avionics core 2 and the open world part 4 of the system 1 for preventing a malicious corruption of these elements.

At the hardware level, the system 1 may include various integrated software on one or more computer hardware platforms. For example, the computer hardware platforms may be an integrated modular avionics (IMA) computer module hosting the avionics core 2 software, with a personal computer (PC) platform connected to the avionics core 2 of the system 1, including specific software for the open world part 4. The computer hardware platforms may include a processor(s) with non-transitory memory that stores software programs executed by the processor to perform avionics and data exchange functions.

The avionics core 2 may include:

(i) a set 7 of software partitions grouped on the same hardware partition or on a set of hardware partitions and implementing the generic flight management functionalities; and (ii) a set 8 of functional services in connection with the set of generic functionalities implemented by the avionics core 2 and open to requests from applications external to the avionics core 2.

It should be noted that: a software partition represents executable software and executes in a defined period of time; and a hardware partition designates on-board computer equipment including a processor unit, a non-transitory memory, physical interfaces with the other hardware partitions and the aircraft's environment, and mechanisms to assist the processor to run the set of software partitions.

Set 3 comprises a plurality of remote functionalities F1 to Fn. These remote functionalities include, for example, functionalities configured for:

(i) ensuring consistency, merging and/or consolidation of data from the open world applications (of set 5) to the avionics core 2;

(ii) performing all or part of securing these data;

(iii) extracting data from models (weather forecast, etc.) used by open world applications (of set 5) for supplying simplified models of the avionics core 2;

(iv) exporting data from the avionics core 2 to the open world applications (of set 5);

Further functional services offering access for the avionics core 2 may include:

(i) specific data hosted on an open world platform; and (ii) services carried by open world applications (of set 5) via the remote functionalities (specific human/machine interface, and specific performance calculation);

Functional services offering access for the open world applications (of set 5) to: avionics core 2 data; and functional services in connection with the set of functionalities supported by the avionics core 2.

These remote functionalities are integrated into the overall (flight management) system 1 without requiring modification of the software elements of the avionics core 2, but drawing on the functional services provided by the latter. These remote functionalities may be developed independently of the avionics core 2, including by a manufacturer other than that responsible for the development of the avionics core 2.

Furthermore, the exchange interface 6 between the avionics core 2 and set 3 of remote functionalities, is based on the use of encoded messages, namely: bidirectional data requests; bidirectional function execution requests; bidirectional event warnings; bidirectional message transfers; and bidirectional file transfers.

The exchange interface 6 comprises at least one data securing module 10, which is configured for automatically monitoring data to be transmitted and for automatically managing an authorization to transmit data between the avionics core 2 and the remote functionalities of set 3, according to the monitoring.

The data securing module 10 implements the physical link between the avionics core 2 and the open world part 4, in a secure way. The main function of the data securing module 10 is a function of activating/deactivating the connection of the avionics core 2 to the open world part 4.

The data securing module 10 includes:

(i) a switching element 11 capable of being controlled. The switching element 11 is configured for being able to be brought alternately into one or the other of two different positions, a first position in which it prevents the transmission of data between the open world part 4 and the avionics core 2 (via the link L1), and a second position in which it authorizes the transmission of data (via the link L1); and (ii) a monitoring unit (or module) 12 including at least one security application A1. This security application A1 is configured for monitoring the data so as to be able to detect an incorrect data flow.

The switching element 11 is either a hardware switching element or a software switching element. The switching element may, for example, be a switch (transistor) notably controlled by the monitoring unit 12 and one or more security applications, which are used to isolate the two items of equipment and which cut the link, either automatically upon the detection of a particular condition, or upon an action of the crew. The switching element may be a software switching element, such as a program that automatically cuts the link when a particular condition is detected, e.g. an incorrect data flow, wrong format, etc. The switching element may be located in equipment outside the avionics core 2 and the open world part 4, or if necessary in a specific part.

The monitoring unit 12 may include the following security applications A1 to A3, as represented in FIG. 1: (i) the incorrect data flow detection application A1; (ii) a data consistency and format checking application A2, and (iii) a data decryption application A3. The applications A1 to A3 may be software programs operating within the monitoring unit 12.

The application A2 compares an expected format to a measured format, according to the category of data considered. Even flight plan data and wind and temperature data which have a variable content and size have a known and detectable format and dimension ('range'). The expected format of the data is encoded in the application software, for preventing a malicious person from being able to circumvent the protection. The application A2 acts as a filter by rejecting data which are not in the correct format or in the correct dimension before they are inserted in the avionics core 2, and ensures that some exchanges may take place only for certain well-defined phases of flight (wind and temperature data may be transmitted from the world part 4 to the avionics core 2 only on the ground);

The security application A3 may be a data decryption application that implements a common method of calculating a value (CRC) depending on the data considered. The transmitter and the receiver apply the same algorithm for calculating this value, and if the data is sent with its CRC code, the receiver is capable of decoding the data, recalculating the CRC code and comparing the calculated value with the one received from the transmitter. The decryption ensures that the data have not been corrupted during the transfer of information, but it does not allow checking that the data were originally valid.

The avionics part P1 comprises (in addition to the data format checking and formatting carried out in the remote functionalities) exchange securing functionalities, either at a system module level, or in an upstream avionics firewall. In one particular embodiment, such an avionics firewall is provided in the system 1.

In particular, the system 1 includes in the exchange interface 6, between the switching element 11 and the avionics core 2, flow control checks and functional checks, for ensuring the integrity of the data exchanges.

In addition, the system 1 also includes an exchange interface 13 between the remote functionalities of set 3 of the open world part 4 and set 5 of open world applications, including, for example, an API interface (Application Programming Interface).

Furthermore, the generic flight management functionalities, as implemented by the avionics core 2, may include one or more of the following functionalities:

(i) flight plan management;

(ii) a calculation of trajectory in space;

(iii) a calculation of predictions along the trajectory;

(iv) an extrapolation of meteorological conditions along the trajectory;

(v) a calculation of a position of the aircraft;

(vi) a calculation of deviations between the position of the aircraft and the trajectory;

(vii) a calculation of guidance set points for locking the aircraft onto the trajectory;

(viii) a capacity to manage a 'split' cockpit philosophy; and (ix) one part of a data securing function.

In one particular embodiment, the functional content of the avionics core 2 is limited to the elements strictly necessary for guiding the aircraft on a predefined reference flight plan, and all the functions of defining, revising and updating this reference flight plan and mission management are placed remotely in the open world. The generic functionalities implemented by the avionics core 2 are limited, in this particular embodiment, to the following functionalities:

(i) flight plan management (management of the segment buffer, determination of the active segment, sequencing);

(ii) a calculation of trajectory in space;

(iii) a calculation of deviations between the position of the aircraft and the trajectory; and (iv) a calculation of guidance set points for locking the aircraft onto the trajectory.

In this particular embodiment, the system 1 therefore includes an avionics core 2 reduced to the minimum functionalities for ensuring a robust and integrated guidance of the aircraft on a flight plan predefined by an external system, and remote functionalities distributed over multiple software partitions hosted on multiple hardware partitions of the open world platform, ensuring the residual functions of a normal flight management system, as well as the function of interfacing with the mission management, assistance and crew decision-making support applications, developed in the open world.

In one particular embodiment, only the elements strictly necessary for guidance are retained in the avionics core 2, capable of meeting a classification of 'Hazardous' for RNP AR 0.1 NM operations on a flight plan defined in the open world (but validated by the pilot before the transfer and passing through the exchange interface 6), and the advanced graphical interface capabilities of the open world (laptop, tablet, etc.) are used for handling the definition and revision of the flight plan and mission management.

The system 1 may thus:

(i) be developed at reduced cost (time, expense);

(ii) ensure the consistency of the information provided to the crew by the open world on the one hand and the avionics core 2 on the other;

(iii) ensure the security of the data exchanged between the open world applications (of set 5) and the avionics core 2 via an exclusive link guaranteeing, for example, the integrity of the trajectory on which the aircraft is guided;

(iv) ensure that the exchanges with the open world applications (of set 5) remain in the field of use that guarantees the robustness and performance of the avionics core 2; and (v) increase the stability and maturity of the avionics core 2, notably by limiting the number of upgrades and the risk of associated regression.

Thus an open flight management system 1 is obtained, including a stable avionics core 2 acting as a server for data and functional services about the management of flight plans and the calculation of trajectories and predictions, with which other functions or systems developed independently in the open world can effectively interface.

A description is given below of the operation of the system 1 from a particular example of implementation (or application) concerning a low-speed performance calculation, with reference to FIG. 2.

Figure 2:
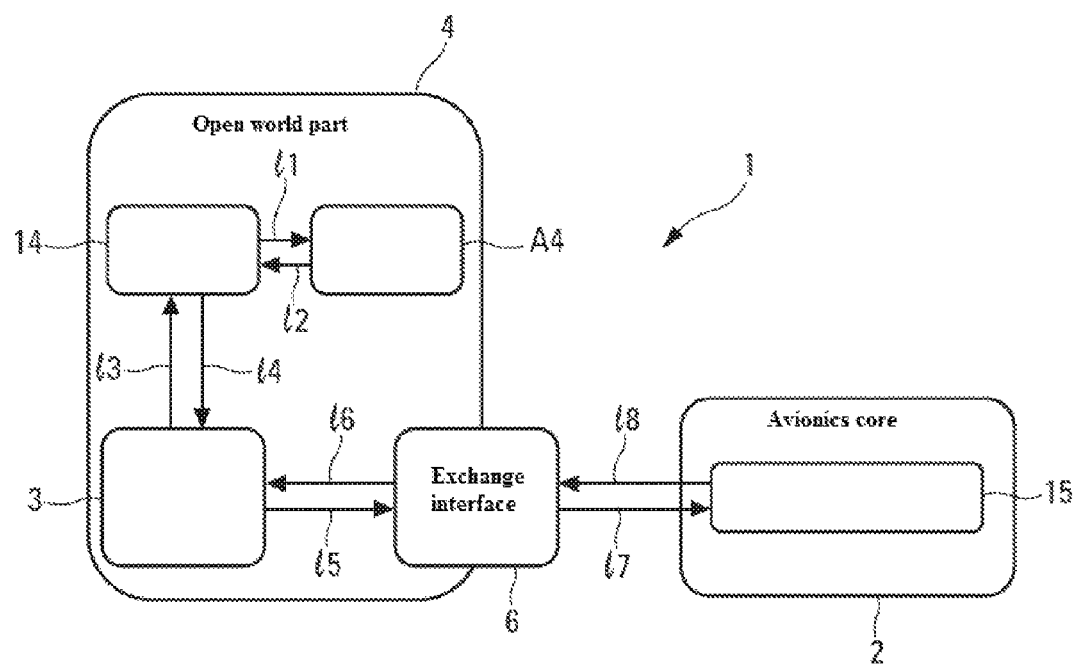
FIG. 2 schematically shows the means of the flight management system in FIG. 1, used for the implementation of a particular calculation example.

In this FIG. 2, the open world part 4, e.g. an electrical device of the EFB type, includes:

(i) a TOPOC (Take-Off and landing Performance Optimization Computer) application, hereafter referred to as 'application A4', which is configured for computing and performing low-speed performance calculations;

(ii) set 3 of remote functionalities; and (iii) a human/machine interface 14 (linked to this application A4), which is connected via links 11 and 12 to application A4, and via links 13 and 14 to set 3.

In addition, the avionics core 2 is provided with a flight plan module 15. The exchange interface 6 is connected to set 3 via links 15 and 16 and the avionics core 2 via links 17 and 18.

Application A4 hosted in the open world, in connection with the remote functionalities in the open world of this application, is intended to enable the crew to compute the take-off and landing performance (characteristic speeds, etc.) of the aircraft, taking into account the latest parameters (wind conditions, temperature, mass of the aircraft, characteristics of a selected runway, etc.), and insert them into the avionics core 2 of the system 1.

In this example, application A4 is responsible for:

(i) the human/machine interface and setting the parameters of requests made by the crew to the avionics core 2;

(ii) performance calculations; and (iii) sending calculation results and data used for calculation to the avionics core 2 on validation by the crew of the results via the remote functionalities.

In addition, the remote functionalities (of set 3) are responsible for:

(i) formatting data received from application A4 or from the avionics core 2;

(ii) checks on the format/dimension and functional consistency of the data transmitted from application A4 to the avionics core 2;

(iii) checks on the exchange flows between application A4 and the avionics core 2; and (iv) the sequencing of exchanges with the avionics core 2.

Furthermore, the avionics core 2 is a service provider for:

(i) transmitting the data entered by the crew in the FMS pages, which are used in the low-speed performance calculations, to application A4 via the remote functionalities (of set 3), for their display on the human/machine interface 14;

(ii) acquiring the calculation results implemented by application A4, as well as the data that have been used in the calculations via the remote functionalities;

(iii) displaying the results and the data in the FMS pages;

(iv) inserting the results and the data in the flight plan; and (v) updating the predictions of the flight plan on the basis of the results and data inserted.

The example considered, in one particular embodiment on the basis of the system 1 represented in FIG. 2, may present the following successive steps:

(i) the crew of the aircraft accesses the human/machine interface for managing low-speed performance calculations on an open world screen, e.g. of the human/machine interface 14;

(ii) application A4 requests the avionics core 2 via the remote functionalities (set 3) to transmit thereto the parameters used in low-speed performance calculation, which have already been entered by the crew in the FMS pages, and displays them on the human/machine interface 14;

(iii) the crew selects the parameters of the low-speed performance calculations in the open world (e.g. the runway contamination state) and starts a calculation;

(iv) a performance calculation module of application A4 acquires the data and the calculation parameters, performs the calculation, and returns the results to the human/machine interface for their presentation to the crew;

(v) the crew checks and validates the results on the human/machine interface 14 of application A4 which transfers the results and the data that have been used in the calculation to the avionics core 2 via the remote functionalities set 3;

(vi) the avionics core 2 acquires the data and the results, updates the FMS pages with the data and the results received;

(vii) the crew again validates the data and the results displayed on the FMS pages; and (viii) the avionics core 2 inserts the data into the flight plan (of module 15) and restarts a calculation of trajectory and predictions on the basis of the new data inserted.

The system 1, as described above, notably offers one or more of the following advantages:

(i) a possibility of interfacing additional functionalities, with the increasingly complex flight management system, without strictly piling these upgrades onto bloated and hard-to-maintain software and benefiting from flexibility of development on the open world platform;

(ii) preparing for the avionics architectures vision of the future, in which the flight management system is confined to the management of the trajectory for guidance, and other systems support mission management and decision-making support;

(iii) a level of industrial independence between the avionics core and the open world applications, the remote functionalities ensuring flexible and robust interfacing between the two worlds;

(iv) an increased maturity of the avionics core by virtue of its wider deployment and its greater stability. Thus, the frequency of upgrading the avionics core is reduced, which helps to reduce anomalies (regressions, introduction of new functionalities that are faulty, etc.);

(v) an ability to install applications interfaced with the avionics core without any impact on the certification of the avionics core (operational approval of the applications);

(vi) flexible management of option mechanisms on open world applications;

(vii) a strict segregation between the functionalities of the avionics core which must be integrated and reliable and the functionalities relating to the mission that have a low criticality; and (viii) the possibility of taking advantage of the computing capabilities of open world equipment for using more complex and more accurate models than those embedded in the flight management system. FMS calculations and predictions are improved by adapting in the most consistent way possible the outputs of these complex models on the simple models of the avionics core. Thus, by improving integration between open world applications and the avionics core, the quality of FMS calculations is also improved.

In one particular embodiment, the flight management system comprises, in its avionics part, two modules, namely a special module and a standard module, the special module hosting, for example, a part of the securing checks. In this case, the open world part may draw on functionalities by exchanging with the standard module via a securing module of the special module.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A management system for an aircraft comprising:
an avionics core including a computer system configured to provide generic aircraft management functions and to support functional services associated with the generic aircraft management functions;
an open world device, separate from the avionics core, configured to provide a remote function, wherein the remote function supports data exchange between the avionics core and an open world application being executed by the open world device, and the remote function is configured to ensure homogeneity and consistency of data being exchanged between the avionics core and the open world application; and
an exchange interface configured to enable or disable data transmission between the avionics core and the open world device depending on data to be transmitted between the avionics core and the open world device, wherein the exchange interface interacts with the remote function during the supported data exchange, and by enabling and disabling the data transmission, the exchange interface provides security with respect to the data transmission to the avionics core.

2. The management system according to claim 1, wherein the avionics core includes:
a set of software partitions grouped on at least one computer hardware partition and implementing the generic management functionalities; and
a set of functional services in connection with the set of generic functionalities implemented by the avionics core and open to requests from applications external to the avionics core.

3. The management system according to claim 1 wherein the remote function include at least one of the following:
a functionality configured to: (i) ensure consistency, merging or consolidation of data from the open world application to the avionics core; (ii) perform at least one part of securing the data; (iii) extract the data from models used by the open world application for supplying a simplified model of the avionics core; and/or (iv) export the data from the avionics core to the open world application;
a functional service allowing the avionics core to access: (i) specific data hosted on an open world platform; and/or (ii) services carried by open world applications via the remote function; and
a functional service allowing the open world application to access: avionics core data, and/or the functional services associated with the set of generic functionalities supported by the avionics core.

4. The management system according to claim 1 wherein the exchange interface between the avionics core and the remote function is a computer based system configured to perform: bidirectional data requests; bidirectional function execution requests; bidirectional event warnings; bidirectional message transfers; and/or bidirectional file transfers.

5. The management system according to claim 1, wherein the exchange interface comprises a data securing module configured to automatically monitor data to be transmitted and automatically disable or enable data transmission between the avionics core and the at least one remote function, according to the monitoring.

6. The management system according to claim 5, wherein the data securing module includes at least one of the following security applications:
an incorrect data flow detection application;
a data consistency and format checking application; and
a data decryption application.

7. The management system according to claim 5, wherein the data securing module comprises a switching element, the switching element being a hardware switch or a software implemented switch.

8. The management system according to claim 1 wherein the management system is a flight management system.

9. The management system according to claim 8, wherein the generic functionalities, implemented by the avionics core, include the following functionalities:
   flight plan management;
   a calculation of a trajectory in a space;
   a calculation of deviations between a position of the aircraft and a trajectory; and
   a calculation of guidance set points for locking the aircraft onto a trajectory.

10. The management system according to claim 8, wherein the generic functionalities, implemented by the avionics core, include at least two of the following functionalities:
    flight plan management;
    calculation of a flight trajectory;
    calculation of a prediction along a flight trajectory;
    an extrapolation of meteorological conditions along a trajectory;
    calculation of a position of the aircraft;
    calculation of deviations between a position of the aircraft and a trajectory;
    calculation of guidance set points for locking the aircraft onto a trajectory; and
    one part of a data securing function.

11. A management system for an aircraft comprising:
    an avionics core including a computer system with a processor and non-transitory memory storing programs configured to provide certain generic aircraft management functions and to support certain services associated with the generic aircraft management functions;
    an open world device including a computer system with a processor and a non-transitory memory storing a remote function program, wherein the remote function program, when executed by the processor, supports data exchange between the avionics core and open world program applications being executed by the open world device, and the remote function ensures homogeneity and consistency of data being exchanged between the avionics core and the open world applications; and
    an exchange interface configured to disable or enable data transmission between the avionics core and the open world device depending on data to be transmitted between the avionics core and the open world device, wherein the exchange interface interacts with the remote function program during the supported data exchange, and by enabling and disabling the data transmission, the exchange interface provides security with respect to the data transmission to the avionics core.

12. The management system according to claim 7, wherein the switching element is configured to be in a first position in which it disables the data transmission between the avionics core and the open world device, or in a second position in which it enables the data transmission between the avionics core and the open world device.

13. The management system according to claim 11, wherein the exchange interface comprises a data securing module, the data securing module including a hardware or software implemented switching element.

14. The management system according to claim 13, wherein the switching element is configured to be in a first position in which it disables the data transmission between the avionics core and the open world device, or in a second position in which it enables the data transmission between the avionics core and the open world device.

15. The management system according to claim 13, wherein the data securing module includes:
    an incorrect data flow detection application;
    a data consistency and format checking application; and/or
    a data decryption application.

* * * * *